United States Patent [19]

Karam et al.

[11] 4,175,959

[45] Nov. 27, 1979

[54] PRECIPITATION OF PARTICULATE TRIGONAL SELENIUM FOR USE IN ELECTROPHOTOGRAPHY

[75] Inventors: Ronald E. Karam, Webster, N.Y.; David J. Swarthout, Allston, Mass.

[73] Assignee: Xerox Corporation, Stamford, Conn.

[21] Appl. No.: 753,957

[22] Filed: Dec. 23, 1976

Related U.S. Application Data

[60] Division of Ser. No. 607,648, Aug. 25, 1975, abandoned, which is a continuation-in-part of Ser. No. 481,587, Jun. 21, 1974, abandoned.

[51] Int. Cl.$^2$ .................... G03G 5/08; G03G 5/087
[52] U.S. Cl. .................................. 430/134; 423/510; 430/135; 430/84
[58] Field of Search ............... 423/510, 508, 1 R; 96/1.5; 252/501

[56] References Cited

U.S. PATENT DOCUMENTS

| | | | |
|---|---|---|---|
| 1,915,703 | 6/1933 | Towne et al. | 423/510 |
| 3,547,596 | 12/1970 | Kolb | 423/510 |
| 3,911,091 | 10/1975 | Karam et al. | 96/1.5 |

OTHER PUBLICATIONS

Kudryavtsev, The Chemistry & Technology of Sente, London Collet's Pub., 1974, p. 149.

*Primary Examiner*—Roland E. Martin, Jr.
*Assistant Examiner*—John L. Goodrow
*Attorney, Agent, or Firm*—Harvey M. Brownrout; Albert A. Mahassel; James Paul O'Sullivan

[57] ABSTRACT

Disclosed is a method of forming finely divided photosensitive trigonal selenium particles which are submicron in size and generally spherical in shape. The method comprises forming an alkaline solution containing selenide and/or polyselenide ions, followed by the precipitation of finely divided trigonal selenium particles from said solution by the addition of an oxidizing agent to said alkaline solution. The trigonal selenium particles are formed into a binder layer photosensitive device by dispersing them with an organic resin in solution with an organic solvent which when applied to a substrate in a uniform layer, is heated to remove the solvent and form the device. Continued heat treatment of the device can result in enhancement of its ability to accept an electrostatic charge.

7 Claims, 7 Drawing Figures

PRECIPITATION OF PARTICULATE TRIGONAL SELENIUM FOR USE IN ELECTROPHOTOGRAPHY

This is a division of application Ser. No. 607,648, filed Aug. 25, 1975, now abandoned, which is a continuation-in-part of application Ser. No. 481,587, filed June 21, 1974, now abandoned.

BACKGROUND OF THE INVENTION

This invention relates in general to electrostatographic copying and more specifically to an improved method of making finely divided photosensitive trigonal selenium particles.

In the art of electrostatographic copying, a photosensitive plate containing a photoconductive insulating layer is first given a uniform electrostatic charge in order to sensitize its surface. The plate is then exposed to a light/shadow pattern of activating electromagnetic radiation which selectively dissipates the charge in the illuminated areas of the photosensitive plate while leaving behind a latent electrostatic image corresponding to the non-illuminated areas. The latent image may be developed and made visible by depositing finely divided electroscopic marking particles or suitable liquid ink on the surface of the plate. This concept was originally described by Carlson in U.S. Pat. No. 2,297,691 and is further amplified and described by many related patents in the field.

Conventional xerographic plates or drums usually comprise a photoconductive insulating layer overlaying a conductive support. A photoconductive material which has had wide use as a reusable photoconductor in commercial xerography comprises vitreous or amorphous selenium. Vitreous selenium in essence comprises super cooled selenium liquid and may readily be formed by vacuum evaporation by cooling the liquid or vapor so suddenly that crystals of selenium do not have time to form. Although vitreous selenium has had wide acceptance for commercial use in xerography, its spectral response is limited largely to the blue-green portion of the electromagnetic spectrum below about 5200 Angstrom Units. In general, one requirement of a photoconductor, such as vitreous selenium, is that its resistivity should drop at least several orders of magnitude in the presence of activating radiation or light in comparison to its resistivity in the dark. Also, the photoconductive layer should be able to support a significant electrical potential in the absence of radiation.

Selenium also exists in a crystalline form known as trigonal or hexagonal selenium which is well known to the semiconductor art for use in the manufacture of selenium rectifiers. In the crystalline trigonal form, the morphology or structure of the selenium consists of helical chains of selenium atoms which are parallel to each other along the crystallographic c-axis. Trigonal selenium is not normally used in xerography as a homogeneous photoconductive layer because of its relatively high electrical conductivity in the absence of activating radiation, although in some instances trigonal selenium can be used in binder structures wherein trigonal selenium particles are dispersed in a matrix of another material such as an electrically insulating resin, an electrically active organic material, or a photoconductor such as vitreous selenium. Trigonal selenium has an advantage over amorphous selenium in that, unlike amorphous selenium, it is sensitive to radiation of wavelengths over most of the visible spectrum.

U.S. Pat. Nos. 2,739,079 and 3,692,521 both describe photosensitive members utilizing small amounts of crystalline hexagonal (trigonal) selenium contained in predominantly vitreous selenium matrices. In addition, copending U.S. patent application Ser. No. 669,915, filed Sept. 22, 1967, describes a special form of red hexagonal selenium suitable for use in binder structure in which finely divided red hexagonal selenium particles are contained in a resin binder matrix.

Although trigonal selenium exhibits a wider spectral response than vitreous selenium, as stated above, trigonal selenium is not normally used in xerography because of its relatively high electrical conductivity in the dark. However, imaging structures which are able to use hexagonal selenium particles would have advantages over those using vitreous selenium with regard to improved spectral response. Further, the use of trigonal selenium in xerographic members, especially in the binder form, would provide greater ease in the manufacture of the photoconductive device in that the expensive vacuum coating apparatus required for forming vitreous selenium would not be necessary in forming a binder layer containing trigonal selenium particles. Binder layers are also inherently more flexible than evaporated layers. In addition, solvent coated binder layers can adhere more tenaciously to substrates than conventional vacuum evaporated layers.

While methods are known for precipitating crystalline selenium from an alkali solution of selenide or polyselenide ions by the addition of an oxidizing agent (see for example U.S. Pat. No. 1,915,703 to Towne et al) the prior art methods are not particularly suitable for preparing trigonal selenium particles having the physical and electrical characteristics necessary for effective use in electrostatographic photoreceptors. This is the case because in the absence of careful control over the precipitation of trigonal selenium both in terms of temperature and relative concentration of reactants, the selenium precipitated is unsuitable for the use contemplated. This is because failure to properly control the precipitation may result in large rod-like crystals being precipitated. These crystals are undesirable because it is difficult to reproducibly fabricate a uniform electrostatographic binder layer photoreceptor from them. In addition, the failure to carefully control both synthesis and post synthesis parameters can lead to forms of trigonal selenium which lack acceptable electrical properties.

It would be desirable, and it is an object of the present invention to provide a novel method for the preparation of trigonal selenium.

Another object is to provide such a method which produces submicron, generally spherical particles of trigonal selenium.

An additional object is to provide a method for the preparation of trigonal selenium particles which exhibit good photoconductivity and acceptable resistivity in the dark.

SUMMARY OF THE INVENTION

The present invention is directed to a method of forming finely divided photosensitive trigonal selenium particles suitable for use in a photosensitive member. In its broadest aspects, the invention comprises forming an alkaline solution containing selenide and/or polyselenide ions, followed by the precipitation of the finely divided particles of trigonal selenium. These photosensitive trigonal selenium particles may be used in any suitable imaging device such as in a single binder layer containing trigonal selenium particles dispersed in an organic matrix material, or as a photoinjecting binder layer in a composite imaging member which may have more than one layer.

DETAILED DESCRIPTION AND PREFERRED EMBODIMENTS

Figure 1:
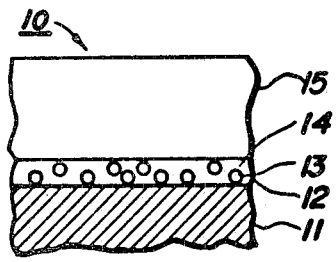

According to the present invention, finely divided trigonal selenium particles are made by the oxidative precipitation of selenium from an alkaline solution of selenide and/or polyselenide ions at a precipitating temperature no greater than about 70° C. The hydroxide ion concentration in the alkaline solution is maintained at a level sufficient to provide a stoichiometric excess of hydroxide over the selenide and/or polyselenide. In one example of the invention, high purity selenium (99.99%) in the vitreous or amorphous form is dissolved in a solution of sodium hydroxide. The solution is agitated at an elevated temperature until substantially all of the selenium is taken into the solution. The solution is then diluted, usually with deionized water, and the precipitation of trigonal selenium is carried out by the addition of an oxidizing agent, such as hydrogen peroxide, to said solution. The trigonal selenium particles are then filtered from the solution and washed in deionized water to remove any impurities.

The following two equations illustrate the process of the present invention. Equation (1) illustrates the dissolving of the high purity selenium into a solution of sodium hydroxide. Equation (2) illustrates the precipitation of selenium from solution to the crystalline trigonal selenium form.

(1) 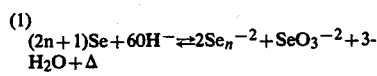
$(2n+1)Se + 6OH^- \rightleftharpoons 2Se_n^{-2} + SeO_3^{-2} + 3H_2O + \Delta$ (2) 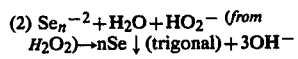
$Se_n^{-2} + H_2O + HO_2^-$ (from $H_2O_2$) $\rightarrow nSe \downarrow$ (trigonal) $+ 3OH^-$ It has been discovered that in carrying out the reactions illustrated by equations (1) and (2) at a temperature no greater than about 70° C. and with a stoichiometer excess of hydroxyl ion over the selenium, the process results in the precipitation of submicron, generally spherical trigonal selenium particles as opposed to the undesirable large fiberlike crystals obtained when either the temperature and/or reactant ratio are outside the limits found to be desirable. While Applicants are not to be bound by any particular theory of operation, it is believed that the reaction conditions found to be beneficial are desirable because they tend to shift the equilibrium in equation (1) to the right thereby reducing the amount of elemental selenium in suspension and thereby reducing the number of heterogeneous nucleation sites which can cause the formation of the undesirable fiberlike particles. In addition, keeping the reaction temperature at a level no greater than about 70° C. reduces the mobility of all species in solution or suspension and thereby reduces the amount of contact which takes place between what elemental selenium remains in suspension and the precipitating selenium atoms. By reducing the number of suspended selenium particles which can act as heterogeneous nucleation sites and restricting their mobility, the formation of large, fiber-like trigonal selenium crystals is substantially eliminated. By preventing contact between suspended elemental selenium and the precipitating atoms, formation of the trigonal selenium precipitate by oxidation of $Se_n^{-2}$ to $nSe°$ results in a generally spherical precipitate due to the precipitated particle formation taking place on homogeneous nucleation sites.

In addition to having a substantial effect on the morphology of the trigonal selenium particles prepared, carring out the precipitation as disclosed herein results in the formation of a precipitate having improved electrical properties.

In carrying out the above process, any suitable alkaline material capable of placing elemental selenium in solution in the form of selenide and/or polyselenide ions may be used. Typical alkaline materials include sodium hydroxide, potassium hydroxide, rubidium hydroxide, cesium hydroxide, etc. In general, the concentration of all ionic species, in solution, at equilibrium, are interdependent according to the equilibrium equation:

$$K = [Se_n^{-2}]^2 [SeO_3^{-2}]/[OH^-]^6$$

where K is the equilibrium constant, and the bracketed quantities represent molar concentrations of the species shown. As previously established, it is advisable to use a quantity of hydroxide sufficient to insure that equation (1) proceeds toward completion. If the solution is to be diluted with deionized water after the initial dissolution of selenium, it is advisable to increase the concentration of hydroxide such that any precipitation of selenium on dilution is kept to a negligible minimum. Some dilution of the solution represented by equation (1) will usually be necessary since rather high concentrations of $OH^-$ are normally used to dissolve the selenium in order to increase the dissolution rate. This high $OH^-$ concentration will tend to retard equation (2), and accordingly, some dilution is required after dissolution of the selenium to reduce the $OH^-$ concentration. As previously mentioned, too much dilution can result in the premature precipitation of selenium. The concentrations of reactants before and after dilution set out in following Example I have been found to work well and are recommended in order to avoid the problems previously referred to. Other concentrations of reactions and/or dilution amounts can be determined by routine experimentation if desired.

The oxidizing agent may comprise any suitable oxidant which will cause the oxidation and precipitation of selenide and/or polyselenide ions from solution by oxidation of the selenide or polyselenide ions to trigonal selenium. Typical oxidizing agents include hydrogen peroxide, potassium permanganate, potassium ferricyanide, oxygen and peroxodisulfate. In general, the concentration of the oxidizing material should be about 5 to 10 molar but concentrations outside this range may also be used.

It has been found that trigonal selenium particles precipitated above 70° C. do not have the desired properties both in terms of shape and particle size. It has also been determined that the precipitation temperature has an effect on the electrical properties, i.e. charge acceptance and photodischarge, of the trigonal selenium formed in the process and that the preferred precipitation temperature will vary depending on how the fabrication of the binder layer photoreceptor containing the trigonal selenium particles is accomplished.

Typically the binder layer is prepared by dispersing the particulate trigonal selenium in a solution of an electrically active or insulating organic resin to form a uniform dispersion which is applied to a substrate in an even layer. The solvent is removed thereby leaving a smooth continuous binder layer of trigonal selenium in the resin matrix on the substrate. Dispersion of the trigonal selenium particles and resin in the carrier liquid is accomplished by conventional means such as milling or by the use of ultrasonic dispersion techniques. In general, any precipitating temperature below about 70° C. and above the freezing point of the solution will be satisfactory when the dispersion is accomplished by milling the trigonal selenium in the solution of binder resin. However, when fabrication is accomplished by ultrasonic dispersion, the photodischarge rate of the photosensitive device so prepared is found to decline with decreasing precipitation temperature and reaches a region of limited utility at about room temperature or below.

It has also been discovered that the electrical properties of the trigonal selenium prepared under certain conditions can be enhanced by a post precipitation heat treatment, i.e. annealing. This heat treatment is normally carried out after fabrication of the trigonal selenium/organic resin binder layer. Thus, when the trigonal selenium particles are precipitated at 50° C. or higher, annealing at a temperature of from about 75° to 150° C. for a time of at least about 3 hours is desirable in order to provide a photosensitive device having good charge acceptance. Heating the precipitated trigonal selenium to about 100° C. for approximately 16 hours has been found to be a preferred technique in order to provide a device having a high degree of charge acceptance. At precipitation temperatures below 50° C., post precipitation heating at about 40° C., which can be accomplished simultaneously with solvent removal, has been found satisfactory. Since the main drawback to the use of trigonal selenium in electrostatographic copying is its high conductivity in the dark and therefore poor charge acceptance, the significance of the annealing step is apparent. In addition, systems which do not charge well show relatively poor photodischarge when poly(vinylcarbazole) is used as the binder resin because of field dependent mobilities. Thus, improvement of charge acceptance enhances the photodischarge speed of such devices.

The particulate trigonal selenium formed by the present invention can be utilized for a variety of imaging structures, illustrated more clearly by FIGS. 1-5 of the drawings.

FIG. 1 comprises an imaging member 10 having a conductive substrate 11 overcoated with a binder photogenerating layer 12 comprising trigonal selenium particles 13 dispersed in a matrix 14 which usually comprises an electrically active polymer such as poly(N-vinylcarbazole) (PVK), polyvinyl pyrene (PVP), or 2,4,7-trinitro-9-fluorenone (TNF); or a combination of PVK or PVP, with TNF or similar compounds. A transport layer 15 overlays the photogenerating binder layer and comprises an electrically active material such as polyvinylcarbazole, polyvinyl pyrene, PVK or PVP with TNF. The TNF is preferably blended with a polymeric material in order to improve the mechanical properties of the device. Under the influence of an electrical field, such polymers are capable of transporting a photoinjected charge from the photogenerating layer and hence are referred to as active polymers. A satisfactory thickness for the binder photoinjecting layer is from about 0.5 to 6 microns. The thickness of the active transport layer is from about 5 to 100 microns, but thicknesses outside this range can also be used. Preferably a thickness range of about 5 to 25 microns has been found to be particularly satisfactory. These structures are more fully defined and described in detail in copending application Ser. No. 371,647, filed June 20, 1973, which is incorporated herein by reference.

Figure 2:
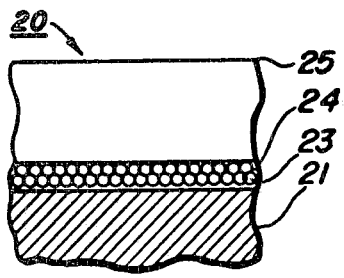

The imaging member 20 of FIG. 2 is similar to the member of FIG. 1 except that substrate 21 is overcoated with photoinjecting layer 22 comprising the same trigonal selenium particles 23 in substantial particles-to-particle contact contained in an electrical insulating resin matrix 24 such as a silicone resin or polyester. Alternatively, the insulating resin may be replaced with an electrically active material of the type described for FIG. 1 above. The transport overlayer 25 is electrically active and identical or equivalent to the materials described for the transport layer 15 of FIG. 1. In operation, the imaging members of FIGS. 1 and 2 are normally uniformly electrostatically charged and then imaged by exposure to a pattern of light to which the top transport layer is substantially nonabsorbing or transparent. Charge carriers are generated by the photogenerating layer, and injected into and transported through the transport layer to selectively discharge a surface charge on top of the transport layer.

Figure 3:
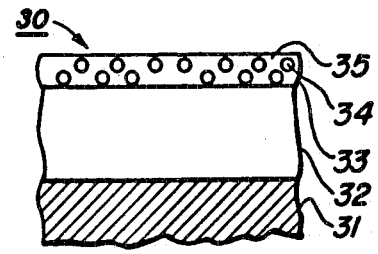
Figure 4:
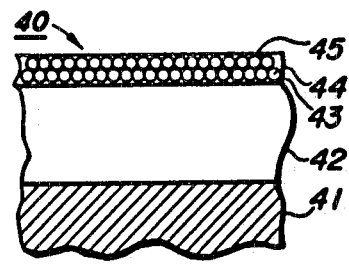

The imaging members 30 and 40 of FIGS. 3 and 4, respectively, are directed to alternative embodiments of FIGS. 1 and 2, respectively, in which the photogenerating layer is contained on top of the transport layer. More specifically, in FIG. 3, conductive substrate 31 is overcoated with a layer of active organic material 32 which contains a top binder layer 33 comprising trigonal selenium particles 34 contained in an active matrix 35. Similarly, FIG. 4 is an alternative embodiment of FIG. 3 in which conductive substrate 41 overlayed with a transport layer 42, contains a binder layer 43 in which the trigonal selenium particles 44 are in substantial particle-to-particle contact and contained in a matrix of electrically insulating material 45 or an active material such as PVK, PVP, PVK or PVP and TNF. In operation the imaging members of FIGS. 3 and 4 are uniformly electrostatically charged to a given polarity and then imaged with light to which the top photogenerating layer is absorbing. The charge carriers generated by the top layer are injected into and transported through the middle transport layer, while an opposite charge dissipates the electrostatic charge at the surface of the top layer. In this case, the transport layer need not be transparent to light since most of the light is absorbed in the generator layer.

Figure 5:
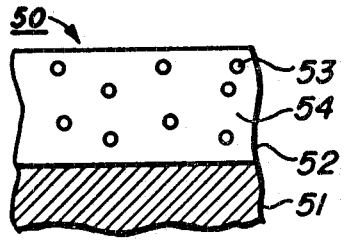

In another embodiment of the present invention, illustrated in FIG. 5, imaging member 50 comprises a single binder layer 52 formed on conductive substrate 51. Binder layer 52 comprises a relatively small amount of photoconductive trigonal selenium 53 contained in an electrically active matrix 54 which may comprise a material such as polyvinylcarbazole or polyvinyl pyrene. These materials may be used in combination with other materials such as TNF in order to improve the cycling characteristics of the imaging member.

The structures in FIGS. 2, 3 and 5 may require a blocking layer between the substrate and binder layer. In the case where the substrate is anodized aluminum, no separate layer is needed. In some applications, it is desirable to use a thin adhesive between the substrate and the main body of the photoreceptor to enhance the mechanical integrity of the device. Thus, for example, a layer of Hytrel polyester less than about 0.2μ can be used as an adhesive blocking layer.

The following examples further specifically define the present invention with respect to the method of precipitating trigonal selenium particles from an alkaline solution. The percentages are by weight unless otherwise indicated. The examples are intended to illustrate various preferred embodiments of the present invention.

EXAMPLE I

About 3.4 grams of 99.99% purity selenium pellets are pulverized in a hand mortar to a size distribution of about 1 to 70 microns and an average particle size of about 14 microns. The crushed pellets are dissolved in an 850 ml solution containing 105 grams of NaOH which are sufficient to drive equation (1) toward completion and also sufficient to keep selenium from precipitating on dilution with water. It is also important to limit the excess hydroxide, since too large an excess of hydroxide inhibits equation (2) from proceeding to completion. The solution is maintained at a temperature of about 85°–90° C., with the solution being constantly agitated. The selenium is completely dissolved in the solution in about 16 hours. At this time, the solution, which has a very deep ruby color, is cooled to about 50° C. and is diluted to 3.4 liter with deionized water that has been preheated to a temperature of about 50° C. at which the precipitation is to be performed. Stoichiometric amounts of 30 weight percent hydrogen peroxide solution are then added to the selenide containing solution whereupon submicron generally spherical trigonal selenium particles are precipitated. The resultant precipitate is then decanted through a filter funnel, washed with deionized water and dried in a vacuum at room temperature overnight.

EXAMPLE II

The trigonal selenium precipitated particles formed by Example I are incorporated in a polyvinylcarbazole (PVK) binder generating layer in the concentration of about 50 percent by volume. The layer is prepared by milling 0.1 gram of PVK (available from BASF) and 0.378 grams of trigonal selenium with 5 cc of $CHCl_3$ and 20 grams of ⅛ inch in diameter steel shot in a 2 oz. glass jar using a standard paint shaker. The ingredients are mixed for 45 minutes to form a coating slurry. The slurry is coated on top of a pre-dried pure PVK layer on an aluminum substrate which has been dried at 100° C. for 24 hours under vacuum with a bird applicator having a 0.003 inch gap to form a photosensitive device. The device is then heat treated under vacuum for 16 hours at 100° C. This structure conforms to that illustrated in FIG. 4 of the drawings. The thicknesses of the generator and transport layers are about 1.5–2.5 and 12 microns, respectively.

EXAMPLE III

Figure 6:
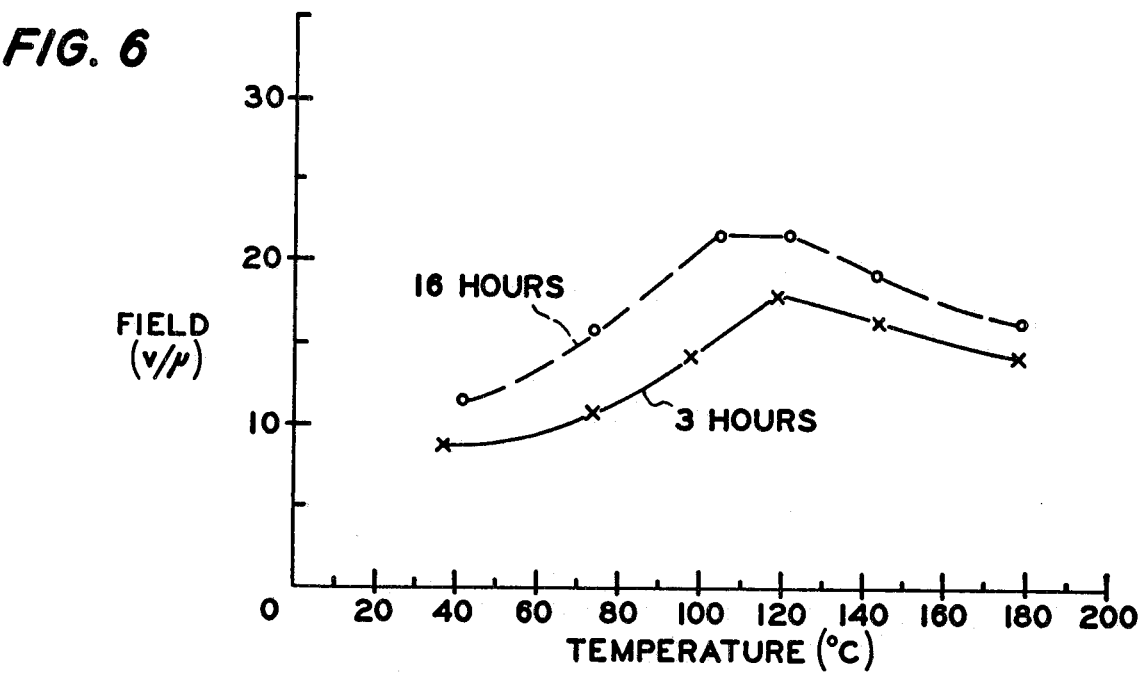
Figure 7:
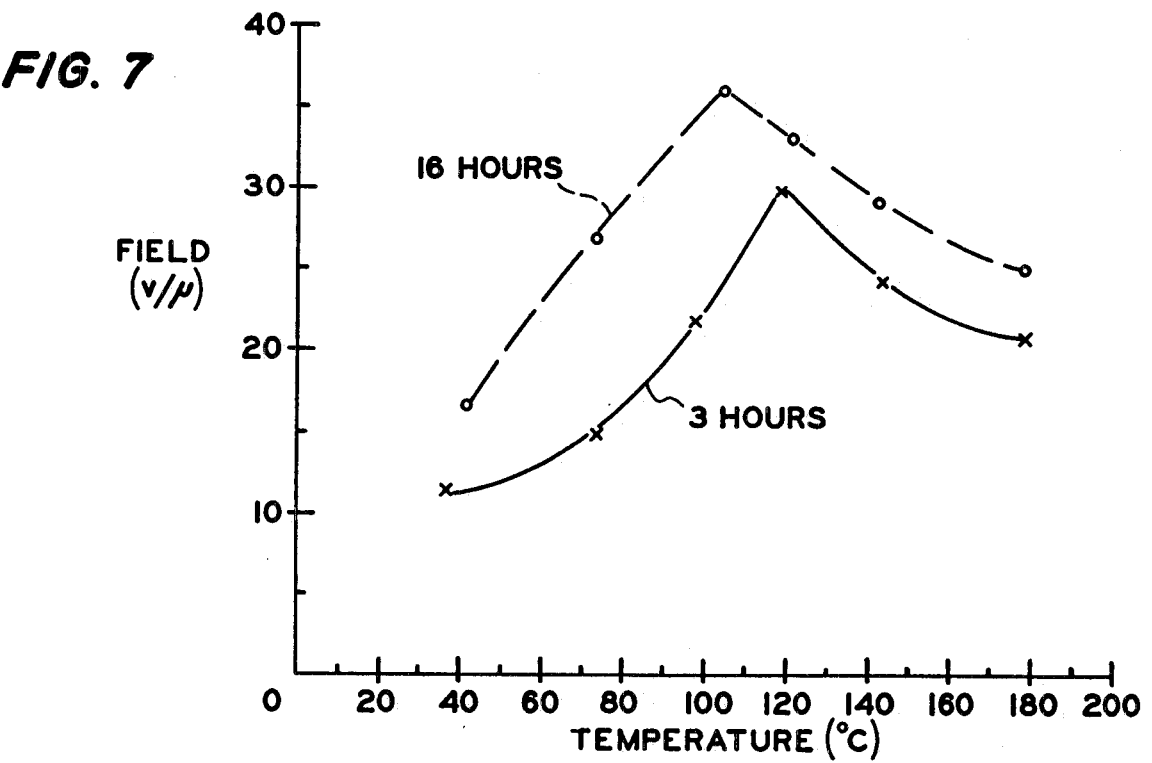

In order to determine the impact between post fabrication treatment temperature and time upon charge acceptance, binder generator layers prepared according to the procedure set out in Example II (except that dispersion is accomplished ultrasonically) are subjected to post fabrication heat treatments at various temperatures for periods of either 3 or 16 hours. The plates are charged to an initial surface charge, Q, and their charge acceptance in volts/micron determined by measuring the electrical field across the photoreceptor at this surface charge density. One set of plates is subjected to an initial surface charge of $1.07 \times 10^{-7}$ coul./$cm^2$. FIG. 6 is a graphical representation of charge acceptance in volts/micron as a function of post fabrication heating temperature (at both 3 and 16 hours heating time) for this set of plates. FIG. 7 represents similar data gathered using an initial surface charge of $3.56 \times 10^{-7}$ coul./$cm^2$.

From FIGS. 6 and 7 it can be determined that a post fabrication heat treatment at a temperature in the range of from 75° to 150° C. enhances charge acceptance. It can be further determined that increasing the heating time beyond 3 hours further enhances charge acceptance of a plate which is heat treated at a given temperature.

In general, the combination of conditions which gives rise to the best charge acceptance values appears to be low precipitation temperature (below 70° C.), slow peroxide addition rate (about 0.1 to 1 ml/minute in the quantities and concentrations of reactants used in Example I) and high post fabrication treatment temperature (about 100° C.) when precipitation is carried out at 50° C. or above.

Control of the Se/$OH^-$ ratio, as previously noted, has been found to effect the morphology of the precipitate. An excess of hydroxide is necessary in order to obtain proper results. For example, a 3.4 liter solution containing 13 grams of selenium, and 62 grams NaOH, on precipitation gave rise to large rod-like single crystal particles, whereas an 850 ml solution containing 3.4 grams of selenium and 105 grams NaOH, on precipitation, gave rise to submicron, spherically shaped, polycrystalline trigonal selenium particles. These fine spherical particles are preferred in that they lend themselves more easily to fabricating photoreceptor devices than do the rod-like particles. Also, the selenium concentration appears to affect the particle morphology with higher concentrations (1 molar or above) giving rise to rod-like particles several microns long.

In preparing binder layers as described in Example II, wherein 0.328 gm. PVK, 0.707 gm. Se and 0.0109 gm. TNF are milled in a 2 oz. glass jar, it has been discovered that there is a relationship between the milling technique used and the electrical properties of the binder layer prepared thereby. For example, it has been determined that the amount of solvent employed during the milling operation has an effect on the photodischarge rate of the binder layer and that the amount of solvent used is interrelated with milling time. When 15 milliliters of solvent is used, the residual field one second after exposure is substantially less than is observed with those devices prepared using 37 milliliters of solvent.

When 15 milliliters of solvent is used, residual increases with milling time so that 15 minutes of milling results in less residual field than milling for 2 hours. Conversely, when 37 milliliters of solvent is used, increased milling time results in a slight decrease in residual field so that those samples which are milled for 2 hours exhibit less residual than those milled for 15 minutes. Measurement of photospeed leads to the same conclusions since photospeed increases slightly with milling time when 37 milliliters of solvent is used but decreases with milling time when 15 milliliters of benzene is used.

In addition there is an interrelation between the amount of steel shot used in the milling operation and the milling time in terms of residual field and photodischarge of the binder layers prepared. For example, it has been determined that when 20 grams of steel shot are used as previously described photospeed increases and residual voltage decreases with increased milling time (2 hours vis-a-vis 15 minutes). Conversely, the use of 100 grams of steel shot results in faster photospeed and lower residual voltage when the shorter milling time is employed.

In all cases, there is an inverse relationship between residual and photospeed since those factors which decrease residual increase photospeed. The effects of milling permaters were determined by a standard Yates analysis technique.

These observations suggest that a certain amount of milling is required for good dispersion but overmilling can be harmful possibly due to its introducing traps and/or recombination centers into the trigonal selenium. Thus, is is apparent that dispersion by milling should be carried out with sufficient thoroughness to achieve complete dispersion but should not be overdone due to the deleterious effects on the photosensitive device prepared thereby.

What is claimed is:

1. A method for the preparation of an electrostatographic photosensitive device which comprises:
   (a) forming an alkaline solution containing selenide and/or polyselenide ions and hydroxyl ions wherein the hydroxyl ions are in stoichiometric excess;
   (b) maintaining the solution at a temperature not in excess of 70° C.;
   (c) adding an oxidizing agent to the solution to oxidize the selenide and/or polyselenide ions to thereby form and precipitate elemental selenium, said addition being carried out at a rate sufficient to cause the precipitation of submicron, generally spherically shaped particles of trigonal selenium;
   (d) separating the particles of trigonal selenium from the solution;
   (e) dispersing the particles of trigonal selenium with an electrically active or insulating organic resin in a solvent to form a uniform dispersion;
   (f) applying the dispersion to a substrate in an even layer;
   (g) removing the solvent from the layer to form a smooth continuous binder layer of trigonal selenium dispersed in a matrix of the organic resin.

2. The method of claim 1 wherein the solution is maintained at a temperature of 50° C. or above prior to the precipitation of trigonal selenium and the binder layer is heated to a temperature of from about 75° C. to 150° C. for a period of at least about 3 hours.

3. The method of claim 2 wherein the binder layer is heated to a temperature of about 100° C. for a period of about 16 hours.

4. The method of claim 1 wherein the solution is maintained at a temperature below 50° C. prior to precipitation and the binder layer is heated to a temperature of about 40° C.

5. The method of claim 1 wherein the organic resin is poly(vinylcarbazole).

6. The method of claim 1 wherein a layer of an electrically active organic material is applied over the binder layer.

7. The method of claim 1 wherein the trigonal selenium and organic resin are dispersed by milling, said milling being carried out to an extent sufficient to accomplish thorough dispersion but not so vigorously so as to adversely effect the electrical properties of the trigonal selenium.

* * * * *